United States Patent
Chen et al.

(10) Patent No.: US 9,461,924 B2
(45) Date of Patent: Oct. 4, 2016

(54) MAINTAINING END-TO-END QUALITY OF SERVICE

(71) Applicant: ARRIS Enterprises, Inc., Suwanee, GA (US)

(72) Inventors: Shi Jin Chen, Alpharetta, GA (US);
Ling-Ling Li, Alpharetta, GA (US);
Edward Alexander Singh, Alpharetta, GA (US); Jose Barroso, Alpharetta, GA (US); Peter Sadrozinski, Suwanee, GA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 114 days.

(21) Appl. No.: 14/467,734

(22) Filed: Aug. 25, 2014

(65) Prior Publication Data

US 2015/0055466 A1    Feb. 26, 2015

Related U.S. Application Data (60) Provisional application No. 61/869,189, filed on Aug. 23, 2013.

(51) Int. Cl.
| | |
|---|---|
| *H04L 12/26* | (2006.01) |
| *H04L 12/857* | (2013.01) |
| *H04L 12/24* | (2006.01) |
| *H04L 12/46* | (2006.01) |
| *H04L 12/801* | (2013.01) |
| *H04L 12/28* | (2006.01) |

(52) U.S. Cl.
CPC ....... *H04L 47/2491* (2013.01); *H04L 12/2801* (2013.01); *H04L 12/4645* (2013.01); *H04L 41/5019* (2013.01); *H04L 47/18* (2013.01); *H04L 41/5022* (2013.01)

(58) Field of Classification Search
CPC ... H04L 12/857; H04L 12/46; H04L 12/801; H04L 12/24; H04L 47/2491; H04L 47/28; H04L 12/4645; H04L 12/2801; H04L 41/5019
USPC ........................................................ 370/231
See application file for complete search history.

(56) References Cited

U.S. PATENT DOCUMENTS

| | | | |
|---|---|---|---|
| 2005/0174943 A1* | 8/2005 | Wang ................ | H04L 12/4645 370/235 |
| 2007/0058535 A1* | 3/2007 | Bichot .................. | H04L 45/00 370/230 |
| 2009/0103539 A1* | 4/2009 | Keeler .............. | H04L 29/12518 370/392 |

* cited by examiner

*Primary Examiner* — Sai-Ming Chan
(74) *Attorney, Agent, or Firm* — Bart A. Perkins (57) ABSTRACT

Methods, systems, and computer readable media can be operable to facilitate transportation of a communication while providing consistent quality of service treatment of the communication throughout the transport of the communication from a client device to an upstream wide-area network, as well as for communications transported from a wide-area network to a client device. In embodiments, quality of service information associated with a communication can be translated at one or more various customer premise equipment devices and/or network components into a format that is compatible with an interface that is to be used to output the communication.

20 Claims, 5 Drawing Sheets

MAINTAINING END-TO-END QUALITY OF SERVICE

CROSS REFERENCE TO RELATED APPLICATION

This application is a non-provisional application claiming the benefit of U.S. Provisional Application Ser. No. 61/869, 189, entitled "Wi-Fi Quality of Service Over DOCSIS Network," which was filed on Aug. 23, 2013, and is incorporated herein by reference in its entirety.

TECHNICAL FIELD

This disclosure relates to maintaining end-to-end quality of service.

BACKGROUND

The Data-Over-Cable Service Interface Specification (DOCSIS) was established by cable television network operators to facilitate transporting data traffic, primarily Internet traffic, over subscriber networks. In addition to transporting data traffic, as well as television content signals over a subscriber network, multiple services operators (MSO) also use their subscriber network infrastructure for carrying voice, video on demand (VoD) and video conferencing traffic signals, among other types.

Communications from wireless client devices received at a customer premise equipment (CPE) device (e.g., gateway) may include quality of service (QoS) tags or identifiers informing the CPE device of a QoS level of treatment that the communication is to be given. Generally, the QoS tag associated with the received communication is lost or dropped at the CPE, and a new QoS treatment is given to the communication as it is routed from the CPE to an upstream headend (e.g., cable modem termination system (CMTS)). However, the new QoS treatment may not be the same level of treatment that was given to the communication at the client device.

Typically, interfaces between a client device and CPE device, the CPE device and a CMTS, and the CMTS and a wide-area network (WAN) each support different QoS types and/or formats. For example, in general, a wireless client device communicates with a CPE device over a wireless (e.g., Wi-Fi) interface (supporting Wi-Fi QoS), a CPE device communicates with a CMTS over a DOCSIS interface (supporting DOCSIS QoS), and a CMTS communicates with the Internet over an Internet protocol (IP) interface (supporting Ethernet QoS). Therefore, a need exists to provide consistent QoS treatment of a communication throughout the transport of the communication from a client device to an upstream WAN, as well as for communications transported from a WAN to a client device.

BRIEF DESCRIPTION OF THE DRAWINGS

Like reference numbers and designations in the various drawings indicate like elements.

DETAILED DESCRIPTION

It is desirable to improve upon methods and systems for providing consistent QoS treatment of a communication throughout the transport of the communication from a client device to an upstream wide-area network (WAN), as well as for communications transported from a WAN to a client device. Methods, systems, and computer readable media are described herein for facilitating the delivery and translation of QoS information associated with communications to and from a client device.

In embodiments, one or more interfaces at a CPE device, such as a gateway, can translate QoS information associated with a communication received from a client device, to corresponding QoS information compatible with a transport interface for a subscriber network, such as a DOCSIS network. The one or more interfaces at the CPE device can also translate QoS information from a subscriber network format to a format that is compatible with a wireless interface between the CPE device and a client device. In embodiments, one or more interfaces at a headend can translate QoS information from a subscriber network format to a format that is compatible with an interface between the headend and an upstream WAN, and the one or more interfaces can translate QoS information from a WAN format to a format compatible with the subscriber network.

Methods, systems, and computer readable media are described herein for maintaining consistent QoS treatment of a communication throughout transport of the communication from a client device to a WAN and vice versa. In embodiments, QoS information associated with a communication can be translated at one or more various network components (e.g., CPE device, CMTS, etc.) into a format that is compatible with an interface that is to be used to output the communication.

Figure 1:
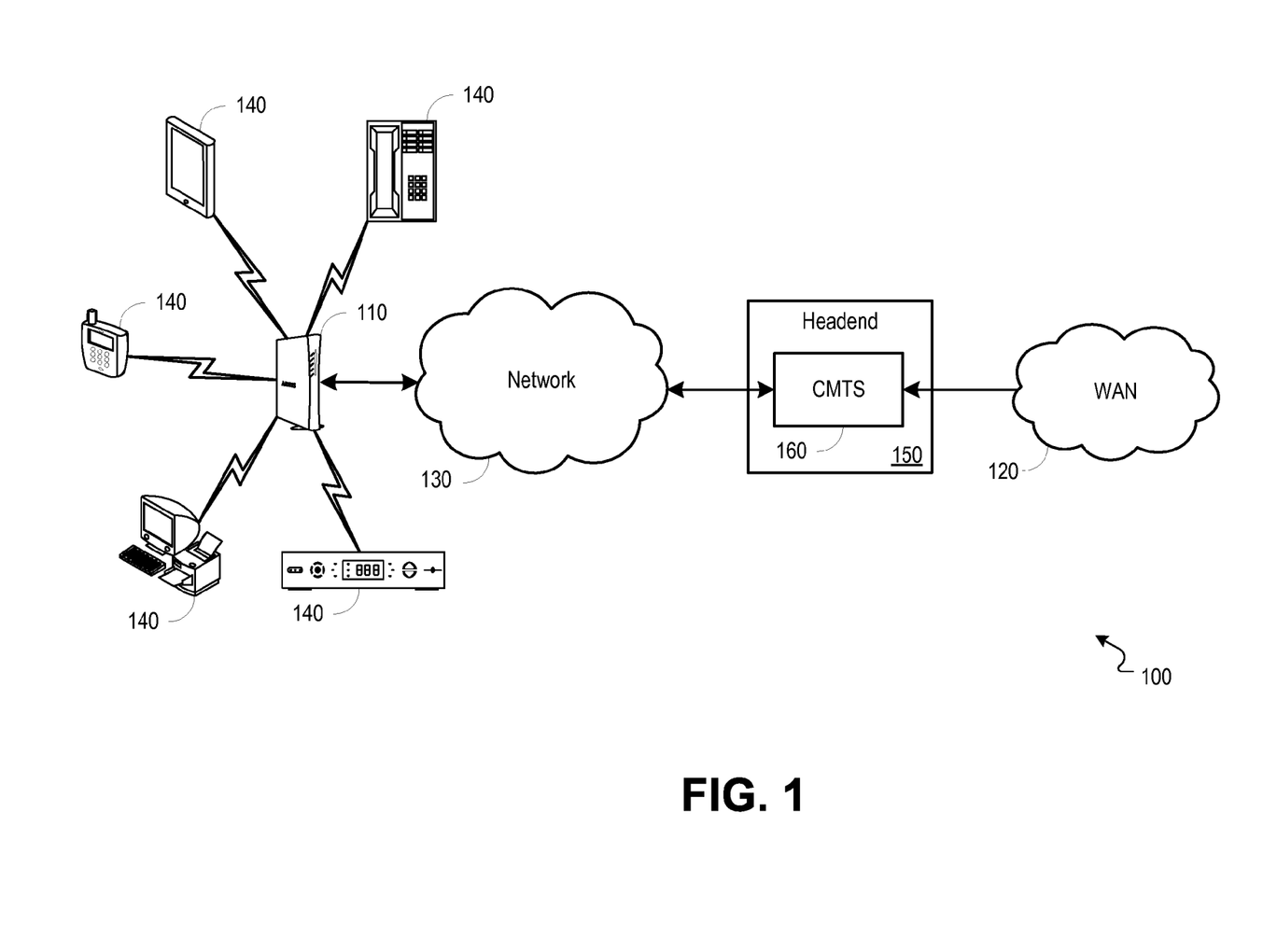
FIG. 1 is a block diagram illustrating an example network environment operable to facilitate the delivery and translation of QoS information associated with communications to and from a client device.

FIG. 1 is a block diagram illustrating an example network environment 100 operable to facilitate the delivery and translation of QoS information associated with communications to and from a client device. In embodiments, one or more host devices (e.g., CPE devices such as a gateway 110, other devices that are not shown such as a modem, a wireless router including an embedded modem, etc.) provide video, data, and/or voice services to a subscriber by communicating with a wide area network (WAN) 120 through a connection to a network 130 (e.g., a local area network (LAN), a wireless local area network (WLAN), a personal area network (PAN), etc.). For example, a subscriber can receive and request video, data, and/or voice services through a client device 140 (e.g., computer, tablet, television, mobile device, set-top box, telephone, digital versatile disc (DVD) player, video game console, etc.) through a connection to a CPE device via the network 130. In embodiments, a gateway 110 can provide an interface for a high-speed wireless data communication, such as long-term evolution (LTE), for client devices 140.

In embodiments, a client device 140 can request content and/or services from a headend 150 through a connection to a CPE device, such as a gateway 120. In embodiments, the format of communications between a gateway 120 and a client device 140 can be any one of many open standards. For example, a gateway 120 may include a Wi-Fi interface, a multimedia over coax alliance (MoCA) interface, an Ethernet interface, a universal plug and play (UPnP) interface, and/or various others. In embodiments, a communication sent from a client device 140 is given a QoS treatment level based on the communication or data packet type (e.g., video, data, voice, etc.). For example, the QoS treatment level can be designated and identified by a tag associated with the communication or one or more data packets making up the communication, and the tag can instruct network components as to a level of priority with which to treat the communication. A QoS tag can be associated with one or more QoS requirements (e.g., packet delay, packet loss, jitter, etc.).

In embodiments, a QoS tag for a communication output from a client device 140 to a gateway 110 can exist in a format that is unique to the interface between the client device 140 and the gateway 110. For example, the wireless QoS tag (e.g., WLAN QoS tag associated with the interface between the client device 140 and gateway 110) may be limited to specific classification types (e.g., voice, video, best effort, background, etc.), and each classification type can be associated with a level of priority that is to be given to the communication by the gateway 110.

In embodiments, the CPE device receiving a communication from a client device can translate a WLAN QoS tag associated with the communication to a QoS tag that is compatible with the CPE device. For example, a gateway 110 can translate a WLAN QoS tag to a virtual local area network (VLAN) QoS tag. The WLAN QoS tag can be mapped to a corresponding VLAN QoS tag. For example, available VLAN QoS tags may be limited to specific classification types (e.g., aggregate priority queues, aggregate weighted random early detection (WRED), bandwidth remaining ratio, VLAN-group policies, multiple levels of priority queues, strict priority queues, etc.), and each classification type can be associated with a priority level that is to be given to the communication by the gateway 110. The WLAN QoS tag can be translated to the VLAN QoS tag that is determined to be the VLAN level of treatment that is the most similar to the WLAN level of treatment. The similarity between WLAN QoS tags and VLAN QoS tags can be based upon a comparison of the QoS requirements (e.g., packet delay, packet loss, jitter, etc.) associated with the tags and/or the data types (e.g., voice, video, data, etc.) associated with the tags.

In embodiments, the CPE device can translate a VLAN QoS tag to a QoS tag that is compatible with an interface between the CPE device and a CMTS 160. For example, where the interface between the CPE device and the CMTS 160 is a DOCSIS interface, the gateway 110 can translate the VLAN QoS tag of a communication to a DOCSIS QoS tag. The VLAN QoS tag can be mapped to a corresponding DOCSIS QoS tag and can further be embedded in the DOCSIS QoS tag. For example, available DOCSIS QoS tags may be limited to specific classification types (e.g., best effort, non-real-time polling service (NRTPS), real-time polling service (RTPS), unsolicited grant service (UGS), unsolicited grant service with activity detection (UGS-AD), etc.), and each classification type can be associated with a priority level that is to be given to the communication by the CMTS 160. The VLAN QoS tag can be translated to the DOCSIS QoS tag determined to be the DOCSIS level of treatment that is the most similar to the VLAN level of treatment. The similarity between VLAN QoS tags and DOCSIS QoS tags can be based upon the QoS requirements and/or the data types associated with the tags.

In embodiments, the CMTS 160 can translate a DOCSIS QoS tag to a QoS tag that is compatible with an interface between the CMTS 160 and a WAN 120. For example, where the interface between the CMTS 160 and WAN 120 is an IP interface, the CMTS 160 can translate the DOCSIS QoS tag of a communication to an Ethernet QoS tag. The DOCSIS QoS tag can be mapped to a corresponding Ethernet QoS tag and can further be embedded in the Ethernet QoS tag. For example, available Ethernet QoS tags may be limited to specific classification types (e.g., background, best effort, excellent effort, critical applications, video, voice, internetwork control, network control), and each classification type can be associated with a priority level that is to be given to the communication. The DOCSIS QoS tag can be translated to the Ethernet QoS tag determined to be the Ethernet level of treatment that is the most similar to the DOCSIS level of treatment.

Figure 2:
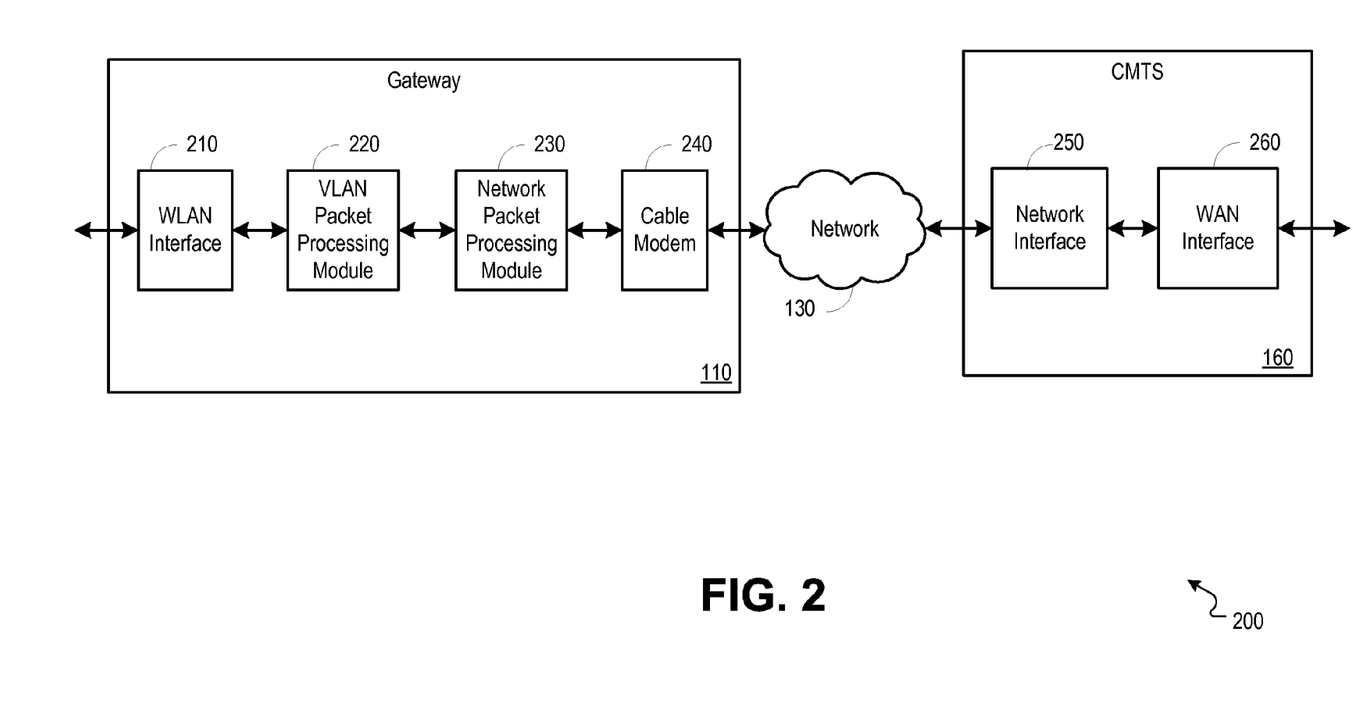
FIG. 2 is a block diagram illustrating an example network operable to facilitate the delivery and translation of QoS information associated with communications to and from a client device.

FIG. 2 is a block diagram illustrating an example network 200 operable to facilitate the delivery and translation of QoS information associated with communications to and from a client device. The network 200 can include a gateway 110 and a CMTS 160. In embodiments, the gateway 110 and CMTS 160 can route communications between a client device 140 of FIG. 1 and a WAN 120 of FIG. 1.

In embodiments, the gateway 110 may include a WLAN interface 210, a VLAN packet processing module 220, a network packet processing module 230, and a cable modem 240. The gateway 110 can receive a communication from a client device 140 of FIG. 1 through the WLAN interface 210. In embodiments, the WLAN interface 210 can support various communication types (e.g., Wi-Fi, MoCA, Ethernet, UPnP, and/or various others). In embodiments, the communication can include a WLAN QoS tag identifying a level of priority to be given to the received communication.

In embodiments, the VLAN packet processing module 220 can identify a priority level with which to treat the received communication based upon the WLAN QoS tag associated with the communication and can translate the WLAN QoS tag to a QoS tag that is compatible with the gateway 110. For example, the VLAN packet processing module 220 can translate the WLAN QoS tag to a VLAN QoS tag. The WLAN QoS tag can be mapped to a corresponding VLAN QoS tag. For example, the WLAN QoS tag can be translated to the VLAN QoS tag that is determined to be the VLAN level of treatment most similar to the WLAN level of treatment. In embodiments, the VLAN packet processing module 220 can access a map or table that associates WLAN QoS tags with corresponding or equivalent VLAN QoS tags. For example, a translation table or translation map can associate WLAN QoS tags and VLAN QoS tags that provide for corresponding or equivalent QoS treatment (e.g., packet delay, packet loss, packet jitter, etc.) of a data packet. WLAN and VLAN QoS tags may be associated based upon data packet types (e.g., voice, video, data, etc.).

In embodiments, the network packet processing module 230 can identify a priority level with which to treat the received communication based upon the VLAN QoS tag associated with the communication and can translate the VLAN QoS tag to a QoS tag that is compatible with the cable modem 240 and/or an upstream network component (e.g., CMTS 160). For example, where the interface between the gateway 110 and CMTS 160 (e.g., network 130) is a DOCSIS network, the network packet processing module 230 can translate the VLAN QoS tag to a DOCSIS QoS tag. The VLAN QoS tag can be mapped to a corresponding DOCSIS QoS tag. For example, the VLAN QoS tag can be translated to the DOCSIS QoS tag that is determined to be the DOCSIS level of treatment most similar to the VLAN level of treatment. In embodiments, the network packet processing module 230 can access a map or table that associates VLAN QoS tags with corresponding or equivalent DOCSIS QoS tags. For example, a translation table or translation map can associate VLAN QoS tags and DOCSIS QoS tags that provide for corresponding or equivalent QoS treatment (e.g., packet delay, packet loss, packet jitter, etc.) of a data packet.

In embodiments, the CMTS 160 may include a network interface 250 and a WAN interface 260. The CMTS 160 can receive a communication from a gateway 110. In embodiments, the communication can include a QoS tag (e.g., DOCSIS tag) identifying a priority level associated with the communication.

In embodiments, the WAN interface 260 can translate the QoS tag associated with the communication (e.g., DOCSIS QoS tag) to a QoS tag that is compatible with a WAN (e.g., WAN 120 of FIG. 1). For example, the WAN interface 260 can translate the DOCSIS QoS tag to an Ethernet QoS tag. The DOCSIS QoS tag can be mapped to a corresponding Ethernet QoS tag. For example, the DOCSIS QoS tag can be translated to the Ethernet QoS tag that is determined to be the Ethernet level of treatment most similar to the DOCSIS level of treatment. In embodiments, the CMTS can forward the received communication, along with the corresponding Ethernet QoS tag, to a WAN 120 through the WAN interface 250.

While only transport and QoS tag translation of upstream communications is described, it should be understood that the CMTS 160 and gateway 110 may also facilitate the transport and QoS tag translation of downstream communications (e.g., a communication delivered from a WAN 120 of FIG. 1 to a client device 140 of FIG. 1. The CMTS 160 may translate an Ethernet QoS tag to a corresponding DOCSIS QoS tag. The gateway 110 may translate a DOCSIS QoS tag to a corresponding VLAN QoS tag, and may translate a VLAN QoS tag to a corresponding WLAN QoS tag.

Figure 3:
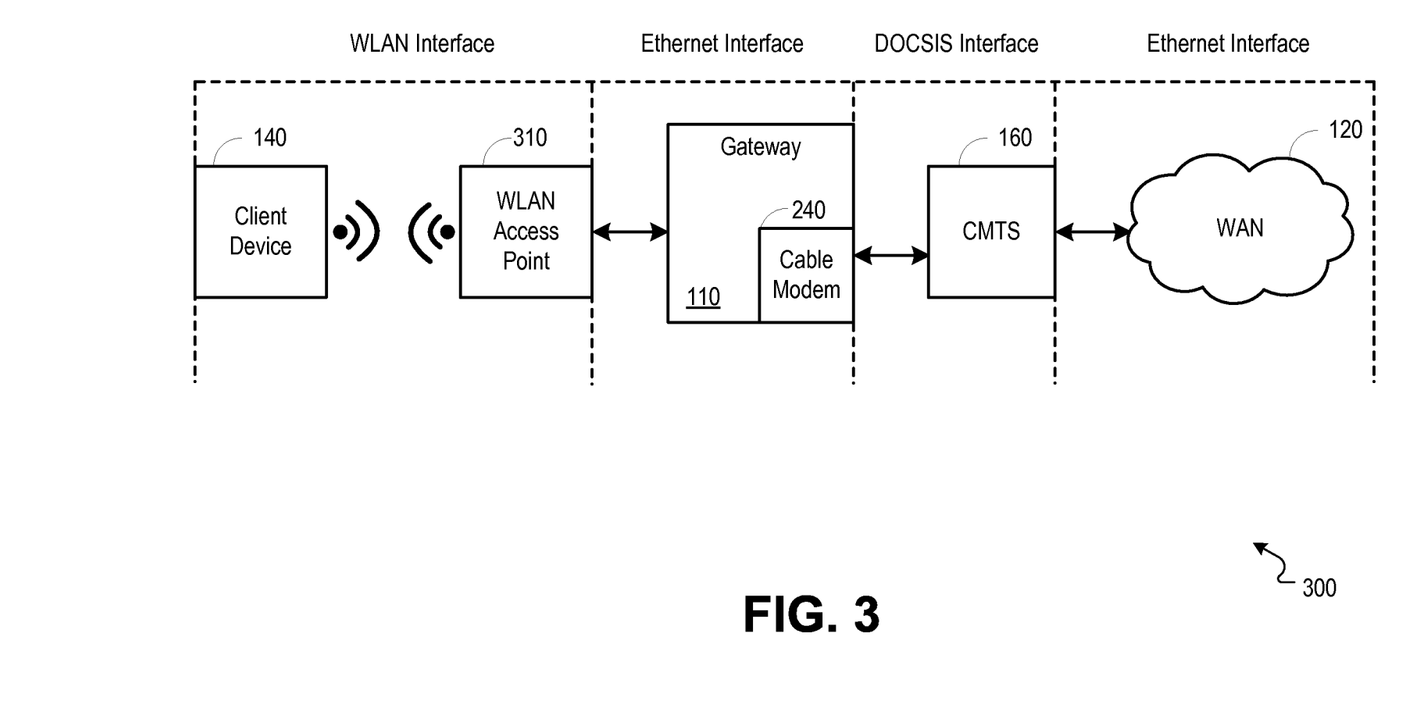
FIG. 3 is a block diagram illustrating an example network environment operable to facilitate the delivery and translation of QoS information associated with communications to and from a client device.

FIG. 3 is a block diagram illustrating an example network environment 300 operable to facilitate the delivery and translation of QoS information associated with communications to and from a client device. In embodiments, a client device 140 can communicate with a gateway 110 through a WLAN access point 310. WLAN QoS (e.g., Wi-Fi multimedia (WMM) QoS) can be preserved for a variety of communications and devices that are passed or operate through a wireless connection (e.g., voice communications, MoCA devices, etc.). When a client device 140 uses WMM (e.g., application using QoS as defined by IEEE 802.11e), traffic output from the client device 140 can be classified into various priority levels (e.g., background, best effort, video, voice, etc.). The communication or payload can then be sent from the client device 140 to the gateway 110, or WLAN access point 310, within a transmit opportunity (TXOP) (e.g., a bounded time interval during which a station can send as many frames as possible). When the communication or payload is received by the gateway, the gateway can maintain the traffic's priority as established by the corresponding WLAN QoS, by translating the WLAN QoS as defined in IEEE 802.11e into VLAN QoS as defined in 802.1Q (e.g., Ethernet-level Class of Service (CoS)). The following TABLE 1 provides an example of corresponding QoS tags that can map translations from QoS defined by 802.11e to QoS defined by 802.1Q.

TABLE 1

| | 802.11e | | 802.1Q | | |
|---|---|---|---|---|---|
| Priority | Access Category | Designation | Code Point | Acronym | Traffic Type |
| Lowest | AC_BK | Background | 1 | BK | Background |
| | AC_BE | Best Effort | 0 | BE | Best Effort |
| | AC_BE | Best Effort | 2 | EE | Excellent Effort |
| | AC_VI | Video | 3 | CA | Critical Applications |
| | AC_VI | Video | 4 | VI | Video |
| | AC_VO | Voice | 5 | VO | Voice |
| | AC_VO | Voice | 6 | IC | Internetwork Control |
| Highest | AC_VO | Voice | 7 | NC | Network Control |

In embodiments, WLAN QoS can be maintained in communications passing from a client device 140, through a gateway 110, through a CMTS 160, to a WAN 120. In embodiments, a CPE device (e.g., gateway 110, stand-alone or embedded cable modem 240) can place a priority tag (e.g., 802.1Q tag) on a WAN-side packet to maintain the QoS priority. For example, VLAN can be used on WAN-side packets in order to maintain the priority while the packet(s) are being processed in the Internet. In embodiments, a gateway 110 (or cable modem 240) and/or CMTS 160 can transmit the packet(s) with associated priority (e.g., priority based on QoS tag) using service streams. For example, a cable modem 240 can place a packet into an appropriate service stream (e.g., a service stream previously negotiated between the cable modem 240 and a CMTS 160) to maintain QoS as defined in IEEE 802.1Q. A CMTS 160 can maintain priority of the packet(s) as defined in an Ethernet header (e.g., per IEEE 802.1Q). In embodiments, the QoS as defined by 802.11e can be preserved across several transmissions, media, and protocols, up to and beyond a CMTS.

Figure 4:
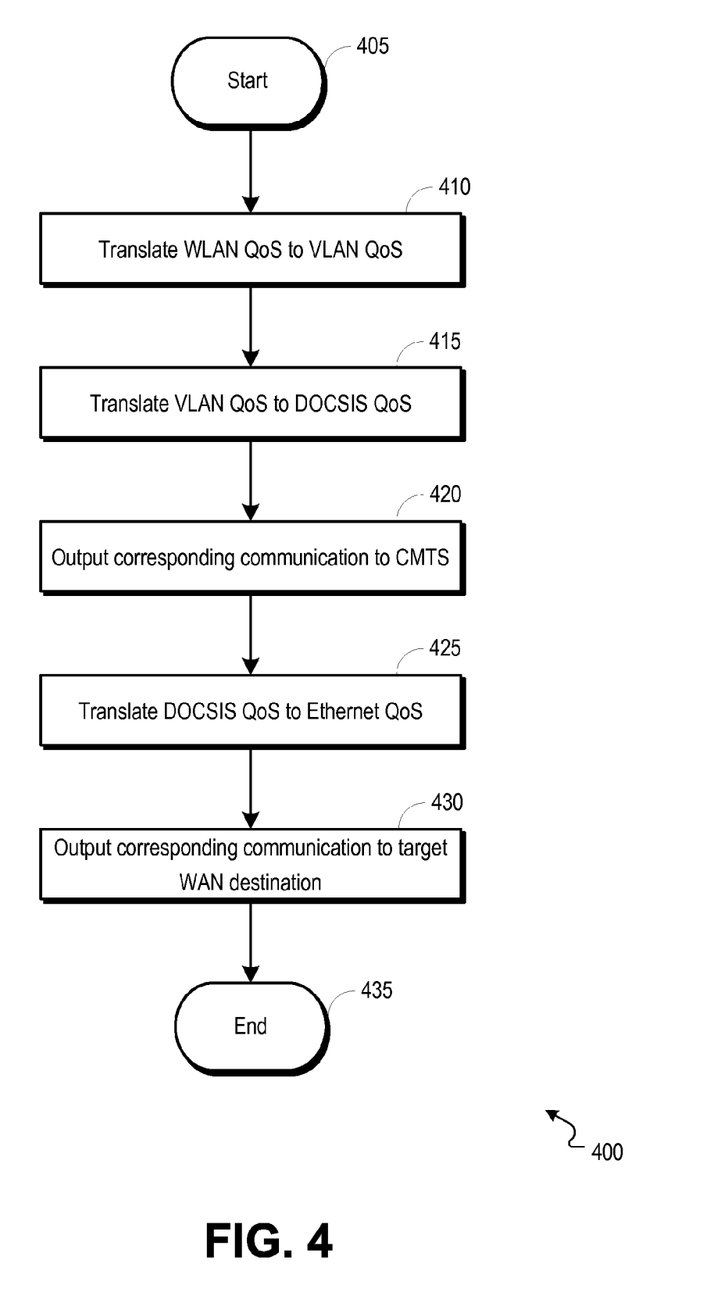
FIG. 4 is a flowchart illustrating an example process operable to facilitate the delivery and translation of QoS information associated with communications to and from a client device.

FIG. 4 is a flowchart illustrating an example process 400 operable to facilitate the delivery and translation of QoS information associated with communications to and from a client device. The process 400 can begin at 405, when a communication is received from a client device (e.g., client device 140 of FIG. 1). For example, a CPE device (e.g., gateway 110 of FIG. 1) can receive a communication from a client device 140, and the communication may include a QoS tag (e.g., WLAN QoS tag) identifying a priority level with which to treat the communication.

At 410, a WLAN QoS tag associated with the received communication can be translated to a QoS tag that is compatible with the gateway 110 receiving the communication (e.g., a VLAN QoS tag). The WLAN QoS tag can be translated to a VLAN QoS tag, for example, by a VLAN packet processing module 220 of a gateway 110 receiving the communication. In embodiments, the WLAN QoS tag can be mapped to a corresponding VLAN QoS tag. For example, the WLAN QoS tag can be translated to the VLAN QoS tag that is determined to be the VLAN level of treatment most similar to the WLAN level of treatment.

At 415, the VLAN QoS tag associated with the received communication can be translated to a QoS tag that is compatible with an interface between a gateway 110 and a CMTS 160 of FIG. 1. For example, when the interface between a gateway 110 and CMTS 160 is a DOCSIS network, the VLAN QoS tag can be translated to a DOCSIS QoS tag. The VLAN QoS tag can be translated to a DOCSIS QoS tag, for example, by a network packet processing module 230 of a gateway 110. In embodiments, the VLAN QoS tag can be mapped to a corresponding DOCSIS QoS tag. For example, the VLAN QoS tag can be translated to the DOCSIS QoS tag that is determined to be the DOCSIS level of treatment most similar to the VLAN level of treatment. The communication can be output from the gateway 110 to a CMTS 160 at 420.

At 425, the DOCSIS QoS tag associated with the communication can be translated to a QoS tag that is compatible with an interface between a CMTS 160 and a WAN destination. For example, where the interface between the CMTS 160 and a WAN 120 is an IP interface, the CMTS 160 can translate the DOCSIS QoS tag of a communication to an Ethernet QoS tag. The DOCSIS QoS tag can be translated to an Ethernet QoS tag, for example, by a WAN interface 250 of a CMTS 160. In embodiments, the DOCSIS QoS tag can be mapped to a corresponding Ethernet QoS tag. For example, the DOCSIS QoS tag can be translated to the Ethernet QoS tag that is determined to be the Ethernet level of treatment most similar to the DOCSIS level of treatment.

At 430, the communication can be output from the CMTS 160 to a WAN destination. The communication can be output, for example, by a WAN interface 250 of the CMTS 160. After the communication is output to the WAN destination, the process 400 can end at 435.

Figure 5:
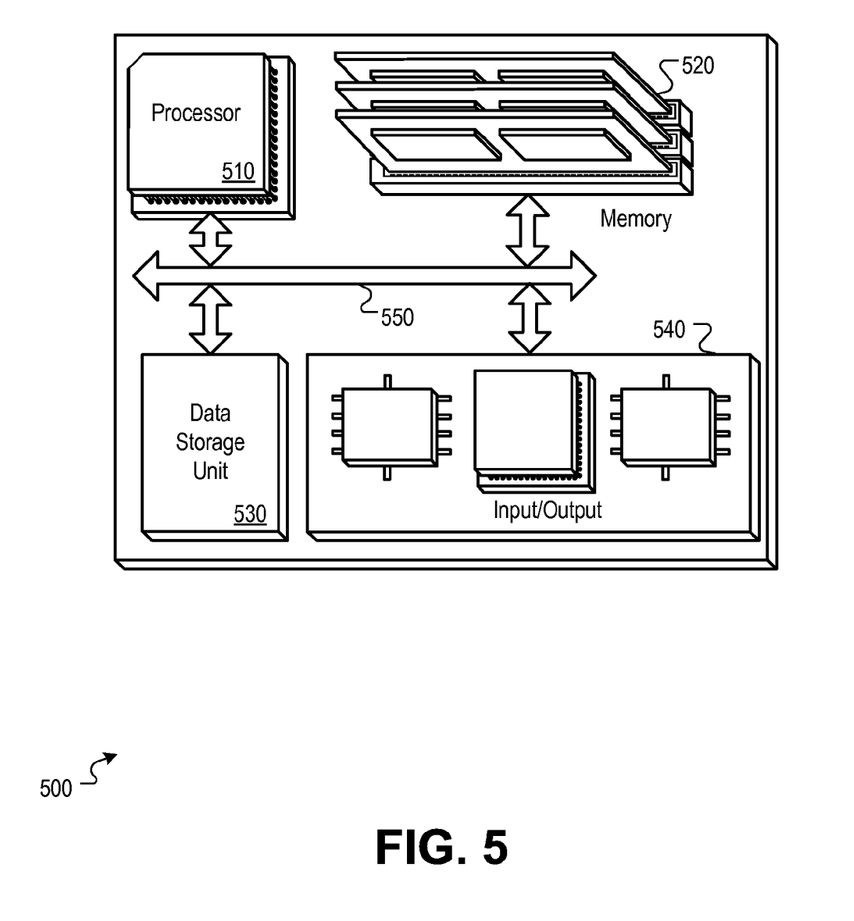
FIG. 5 is a block diagram of a hardware configuration operable to facilitate the delivery and translation of QoS information associated with communications to and from a client device.

FIG. 5 is a block diagram of a hardware configuration 500 operable to facilitate the delivery and translation of QoS information associated with communications to and from a client device. The hardware configuration 500 can include a processor 510, a memory 520, a storage device 530, and an input/output device 540. Each of the components 510, 520, 530, and 540 can, for example, be interconnected using a system bus 550. The processor 510 can be capable of processing instructions for execution within the hardware configuration 500. In one implementation, the processor 510 can be a single-threaded processor. In another implementation, the processor 510 can be a multi-threaded processor. The processor 510 can be capable of processing instructions stored in the memory 520 or on the storage device 530.

The memory 520 can store information within the hardware configuration 500. In one implementation, the memory 520 can be a computer-readable medium. In one implementation, the memory 520 can be a volatile memory unit. In another implementation, the memory 520 can be a non-volatile memory unit.

In some implementations, the storage device 530 can be capable of providing mass storage for the hardware configuration 500. In one implementation, the storage device 530 can be a computer-readable medium. In various different implementations, the storage device 530 can, for example, include a hard disk device, an optical disk device, flash memory or some other large capacity storage device. In other implementations, the storage device 530 can be a device external to the hardware configuration 500.

The input/output device 540 provides input/output operations for the hardware configuration 500. In embodiments, the input/output device 540 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for providing video, data, and/or voice services to a client device 140 of FIG. 1 and/or a CPE device (e.g., gateway 110 of FIG. 1, set-top box, etc.). In embodiments, the input/output device 540 can include driver devices configured to send communications to, and receive communications from one or more networks (e.g., network 130 of FIG. 1, WAN 120 of FIG. 1, etc.).

Those skilled in the art will appreciate that the invention improves upon methods and systems for providing consistent QoS treatment of a communication throughout the transport of the communication from a client device to an upstream wide-area network (WAN), as well as for communications transported from a WAN to a client device. Methods, systems, and computer readable media are described herein for maintaining QoS treatment of a communication throughout transport of the communication from a client device to a WAN and vice versa. In embodiments, QoS information associated with a communication can be translated at one or more various network components (e.g., CPE device, CMTS, etc.) into a format that is compatible with an interface that is to be used to output the communication.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
   receiving, at a host device, a data packet, wherein the data packet is received from a client device, and wherein the data packet comprises a wireless quality of service tag;
   comparing the wireless quality of service tag to a plurality of virtual local area network quality of service tags;
   identifying a virtual local area network quality of service tag associated with the wireless quality of service tag, wherein the association between the virtual local area network quality of service tag and the wireless quality of service tag is based on one or more similarities between quality of service parameters of the virtual local area network quality of service tag and the wireless quality of service tag;
   replacing the wireless quality of service tag with the virtual local area network quality of service tag;
   identifying a quality of service tag compatible with an upstream network component, wherein the quality of service tag is associated with the virtual local area network quality of service tag;
   replacing the virtual local area network quality of service tag with the quality of service tag compatible with the upstream network; and
   outputting the data packet from the host device to the upstream network component.

2. The method of claim 1, wherein identifying the virtual local area network quality of service tag comprises:
   identifying one or more quality of service requirements associated with the wireless quality of service tag; and
   identifying a virtual local area network quality of service tag having one or more quality of service requirements that are equivalent to one or more of the quality of service requirements associated with the wireless quality of service tag.

3. The method of claim 1, wherein identifying the virtual local area network quality of service tag comprises:
   mapping the wireless quality of service tag to a corresponding virtual local area network quality of service tag based upon a translation map stored at the host device.

4. The method of claim 1, wherein identifying the virtual local area network quality of service tag comprises:
   identifying a data packet type associated with the wireless quality of service tag; and
   identifying a virtual local area network quality of service tag associated with the identified data packet type.

5. The method of claim 1, wherein the corresponding quality of service tag compatible with the upstream network component comprises a data over cable service interface specification quality of service tag.

6. The method of claim 1, wherein the data packet is output by a cable modem.

7. The method of claim 1, further comprising:
   translating, at the upstream network component, the quality of service tag compatible with the upstream network component into a corresponding quality of service tag compatible with an Internet protocol interface; and
   outputting the data packet from the upstream network component to a wide-area network destination.

8. The method of claim 7, wherein the quality of service tag compatible with an Internet protocol interface comprises an Ethernet quality of service tag.

9. An apparatus comprising:
   an interface configured to be used to receive a data packet, wherein the data packet is received from a client device, and wherein the data packet comprises a wireless quality of service tag;
   one or more modules configured to:
     compare the wireless quality of service tag to a plurality of virtual local area network quality of service tags;
     identify a virtual local area network quality of service tag associated with the wireless quality of service tag, wherein the association between the virtual local area network quality of service tag and the wireless quality of service tag is based on one or more similarities between quality of service parameters of the virtual local area network quality of service tag and the wireless quality of service tag;
replace the wireless quality of service tag with the virtual local area network quality of service tag;
identify a quality of service tag compatible with an upstream network component, wherein the quality of service tag is associated with the virtual local area network quality of service tag;
replace the virtual local area network quality of service tag with the quality of service tag compatible with the upstream network; and
an interface configured to be used to output the data packet to the upstream network component.

10. The apparatus of claim 9, wherein identifying the virtual local area network quality of service tag comprises:
identifying one or more quality of service requirements associated with the wireless quality of service tag; and
identifying a virtual local area network quality of service tag having one or more quality of service requirements that are equivalent to one or more of the quality of service requirements associated with the wireless quality of service tag.

11. The apparatus of claim 9, further comprising:
a data store configured to store a quality of service tag translation map;
wherein the virtual local area network quality of service tag is identified by mapping the wireless quality of service tag to a corresponding virtual local area network quality of service tag based upon the quality of service tag translation map.

12. The apparatus of claim 9, wherein identifying the virtual local area network quality of service tag comprises:
identifying a data packet type associated with the wireless quality of service tag; and
identifying a virtual local area network quality of service tag associated with the identified data packet type.

13. The apparatus of claim 9, wherein the corresponding quality of service tag compatible with the upstream network component comprises a data over cable service interface specification quality of service tag.

14. One or more non-transitory computer readable media having instructions operable to cause one or more processors to perform the operations comprising:
receiving, at a host device, a data packet, wherein the data packet is received from a client device, and wherein the data packet comprises a wireless quality of service tag;
comparing the wireless quality of service tag to a plurality of virtual local area network quality of service tags;
identifying a virtual local area network quality of service tag associated with the wireless quality of service tag, wherein the association between the virtual local area network quality of service tag and the wireless quality of service tag is based on one or more similarities between quality of service parameters of the virtual local area network quality of service tag and the wireless quality of service tag;
replacing the wireless quality of service tag with the virtual local area network quality of service tag;
identifying a quality of service tag compatible with an upstream network component, wherein the quality of service tag is associated with the virtual local area network quality of service tag;
replacing the virtual local area network quality of service tag with the quality of service tag compatible with the upstream network; and
outputting the data packet from the host device to the upstream network component.

15. The one or more non-transitory computer-readable media of claim 14, wherein identifying the virtual local area network quality of service tag comprises:
identifying one or more quality of service requirements associated with the wireless quality of service tag; and
identifying a virtual local area network quality of service tag having one or more quality of service requirements that are equivalent to one or more of the quality of service requirements associated with the wireless quality of service tag.

16. The one or more non-transitory computer-readable media of claim 14, wherein identifying the virtual local area network quality of service tag comprises:
mapping the wireless quality of service tag to a corresponding virtual local area network quality of service tag based upon a translation map stored at the host device.

17. The one or more non-transitory computer-readable media of claim 14, wherein identifying the virtual local area network quality of service tag comprises:
identifying a data packet type associated with the wireless quality of service tag; and
identifying a virtual local area network quality of service tag associated with the identified data packet type.

18. The one or more non-transitory computer-readable media of claim 14, wherein the corresponding quality of service tag compatible with the upstream network component comprises a data over cable service interface specification quality of service tag.

19. The one or more non-transitory computer-readable media of claim 14, further comprising:
translating, at the upstream network component, the quality of service tag compatible with the upstream network component into a corresponding quality of service tag compatible with an Internet protocol interface; and
outputting the data packet from the upstream network component to a wide-area network destination.

20. The one or more non-transitory computer-readable media of claim 19, wherein the quality of service tag compatible with an Internet protocol interface comprises an Ethernet quality of service tag.

* * * * *